United States Patent [19]
Marroux et al.

[11] Patent Number: 5,880,546
[45] Date of Patent: Mar. 9, 1999

[54] MAGNETIC ACTUATOR PROVIDED WITH A SEPARATOR WALL

[75] Inventors: Olivier Marroux, Paris; Patrice Jamain, Maule; Charles Lambert, Paris, all of France

[73] Assignee: Aerospatiale Societe Nationale Industrielle, France

[21] Appl. No.: 816,157

[22] Filed: Mar. 12, 1997

[30] Foreign Application Priority Data

Mar. 13, 1996 [FR] France ................................. 96 03147

[51] Int. Cl.[6] .............................. H02K 5/10; H02K 5/16; F16C 39/06
[52] U.S. Cl. ............................. 310/90.5; 310/85; 310/86; 310/187; 310/192
[58] Field of Search .............................. 310/85, 86, 187, 310/192, 90.5

[56] References Cited

U.S. PATENT DOCUMENTS

| | | | |
|---|---|---|---|
| 4,508,984 | 4/1985 | Guedj et al. | 310/14 |
| 4,827,169 | 5/1989 | Habermann | 310/90.5 |
| 4,896,064 | 1/1990 | Taiani | 310/104 |
| 4,918,345 | 4/1990 | Vaillant De Guelis et al. | 310/90.5 |
| 5,001,378 | 3/1991 | Miller et al. | 310/178 |
| 5,532,532 | 7/1996 | DeVault et al. | 310/52 |
| 5,698,917 | 12/1997 | Shultz | 310/87 |

FOREIGN PATENT DOCUMENTS

| | | |
|---|---|---|
| A-1239475 | 6/1960 | France . |
| A-0069630 | 1/1983 | France . |
| A-1109208 | 1/1996 | France . |
| A-2289801 | 11/1995 | United Kingdom . |

Primary Examiner—Thomas M. Dougherty
Assistant Examiner—Tran N Nguyen
Attorney, Agent, or Firm—Vanophem Meehan & Vanophem, P.C.

[57] ABSTRACT

A magnetic actuator, for example a magnetic bearing, embodies a fixed part and a mobile part. These parts are ferromagnetic and form an airgap between them extending parallel to a predetermined first direction. The magnetic actuator further embodies a nonmagnetic wall interposed in the airgap. The wall is that of a confinement chamber, for example. In this magnetic actuator one of the fixed and mobile parts embodies fingers penetrating the nonmagnetic wall and directed towards the other of the fixed and mobile parts.

8 Claims, 7 Drawing Sheets

MAGNETIC ACTUATOR PROVIDED WITH A SEPARATOR WALL

BACKGROUND OF THE INVENTION

1. Field of the Invention

The present invention concerns a magnetic actuator embodied by a magnetic circuit formed of a fixed part and a mobile part which do not touch each other and which form between them an airgap into which a separator wall is inserted.

The magnetic actuator is more particularly a magnetic bearing and the wall is that of a confinement chamber, for example.

2. Description of the Prior Art

Specific applications of bearings require the use of a confinement chamber around one of the two relatively moving bodies. Such applications involve a high pressure, for example, a high temperature or a primary or hard vacuum. Other examples are corrosive, toxic or radioactive environments. It is generally not appropriate to place all of the bearing in the confinement chamber. This type of application therefore requires a perfect seal between the two parts of the actuator and therefore makes the use of static seals, which are necessarily rotary seals, between the mobile body and the other body difficult.

A magnetic actuator is then a beneficial solution since it enables a contactless coupling between the different bodies.

In a manner that is known in itself, for example from U.S. Pat. No. 4,918,345, a magnetic bearing is used for magnetically active centering about at least one centering axis of a body mobile relative to another body. The two bodies include ferromagnetic portions with no contact between them and the mobile body is said to be "suspended". Magnetically active centering implies the use of a winding in which flows a variable current adapted to generate a variable magnetic flux. A bearing of this kind generally further embodies permanent magnets that can in some configurations procure passive centering about one or more other axes. Magnetic bearings are frequently used in the case of rotary bodies but can also be used in the case of linear motion.

However, the walls of the confinement chamber extend into the airgap between the fixed part and the mobile part; these walls, which may be thick, must in principle be nonmagnetic so as not to create any magnetic short-circuit and therefore constitute a spurious airgap within the airgap of the magnetic actuator. This spurious airgap is even more of a problem if it is necessary to allow for differential expansion of the mechanical components due to temperature and/or compression, and therefore to provide an additional airgap. Finally, sufficient relative movement must be preserved between the fixed and mobile parts to guarantee the absence of contact.

This increase in the size of the airgap compared to a situation in which there is no wall degrades the performance of the magnetic actuator or increases the size of the components, the size of the windings, the excitation current, etc, if the same performance is to be maintained. This increase in the "dimensions" of the magnetic actuator is a cost penalty and also constitutes a penalty in terms of the space occupied by the actuator. It can even become technically impossible to implement it.

To reduce the required airgap consideration could be given to interrupting the wall at the level of the airgap and sealing the wall to the fixed body. This seal would be very difficult to achieve, however. The thickness of the wall could instead be reduced at the airgap, for example by means of a groove into which one of the bodies, for example the fixed body, would penetrate. This would reduce the mechanical strength of the chamber, however, and the latter would no longer fulfill its function.

The present invention is aimed at remedying these drawbacks of the prior art by providing a magnetic actuator having a wall in its airgap and the configuration of which has an airgap that is increased only a little or not at all compared to an actuator with no wall, so retaining substantially the same performance, while providing a seal and mechanical strength equivalent to that obtained with an actuator having a wall in a wider airgap.

SUMMARY OF THE INVENTION

To this end, the invention proposes a magnetic actuator embodying a fixed part and a mobile part, the parts being ferromagnetic and forming an airgap between them extending parallel to a predetermined first direction, and a nonmagnetic wall interposed in the airgap, wherein one of the fixed and mobile parts embodies fingers penetrating the nonmagnetic wall and directed towards the other of the fixed and mobile parts.

A magnetic actuator structure of the above kind has the advantage of substantially the same electromagnetic behavior as a structure with no wall and having an airgap equal in size to the gap between the fingers and the other of the fixed and mobile parts, the other components being similar.

This magnetic actuator also has the advantage of a wall with a seal and mechanical strength equivalent to those of a wall the same size but without any fingers penetrating the wall.

The features and advantages of the invention are particularly well suited to a magnetic bearing.

In accordance with a preferred feature, the fingers are cylindrical.

Two adjacent fingers advantageously have respective longitudinal axes spaced by a mean distance between 1.2 times the width of the fingers and 3 times the width of the fingers. The gap between two adjacent fingers is occupied by the wall.

In accordance with another feature, the fingers extend 90% to 98% of the thickness of the wall. The seal and the mechanical strength are then easier to achieve.

The fingers are advantageously fixed relative to the fixed part.

However, the fingers may be mounted to slide in respective housings formed in the fixed part. Means for pushing the fingers towards the wall may additionally be provided. This variant accommodates expansion of the various components of the magnetic actuator.

The features and advantages of the present invention will emerge more clearly from a reading of the following description of several embodiments illustrated by the accompanying drawings.

DETAILED DESCRIPTION OF THE PREFERRED EMBODIMENTS

Figure 1:
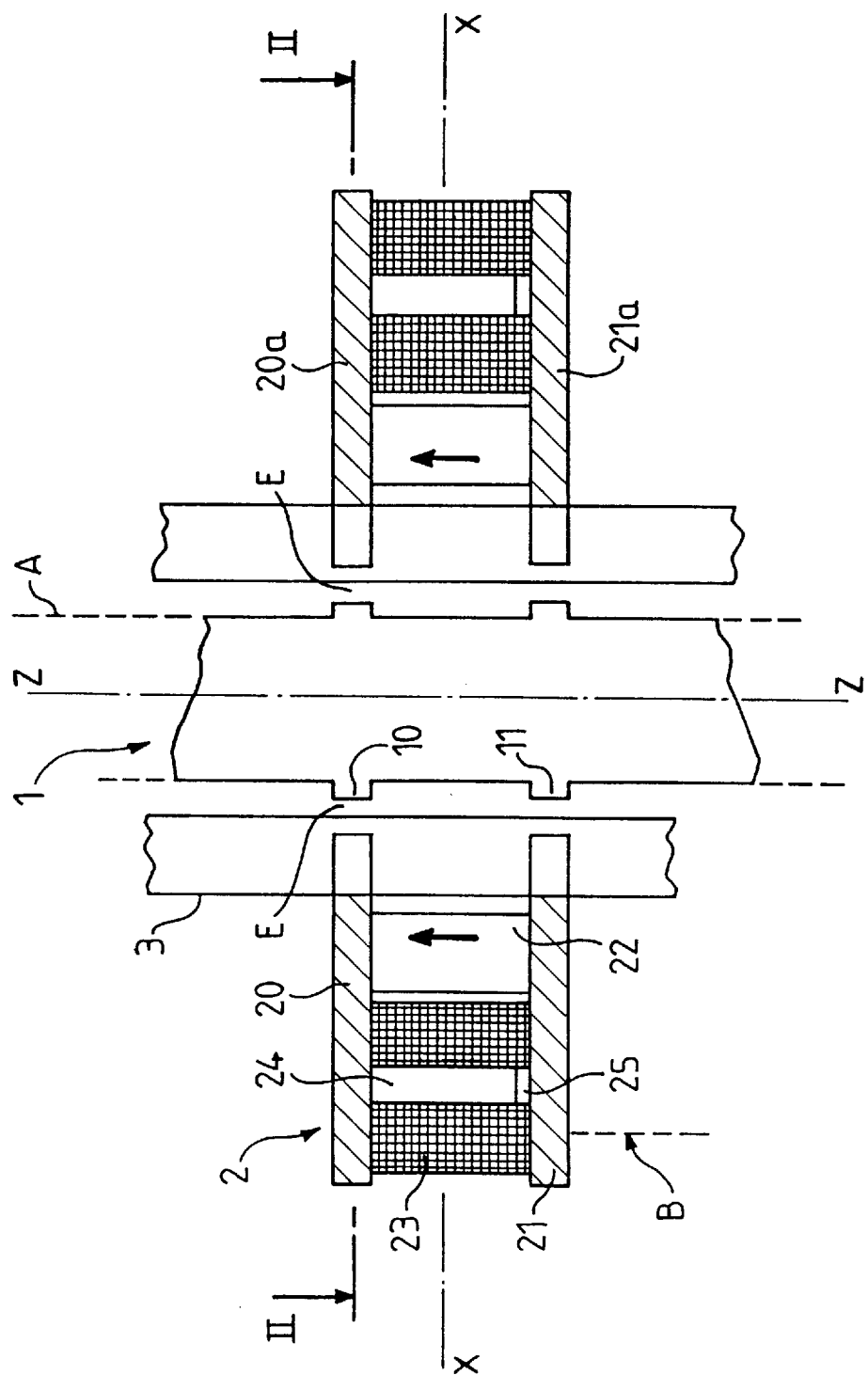
FIG. 1 shows a first embodiment of a magnetic bearing in accordance with the invention in diagrammatic axial sectional view taken along a plane containing a reference axis Z—Z.
Figure 2:
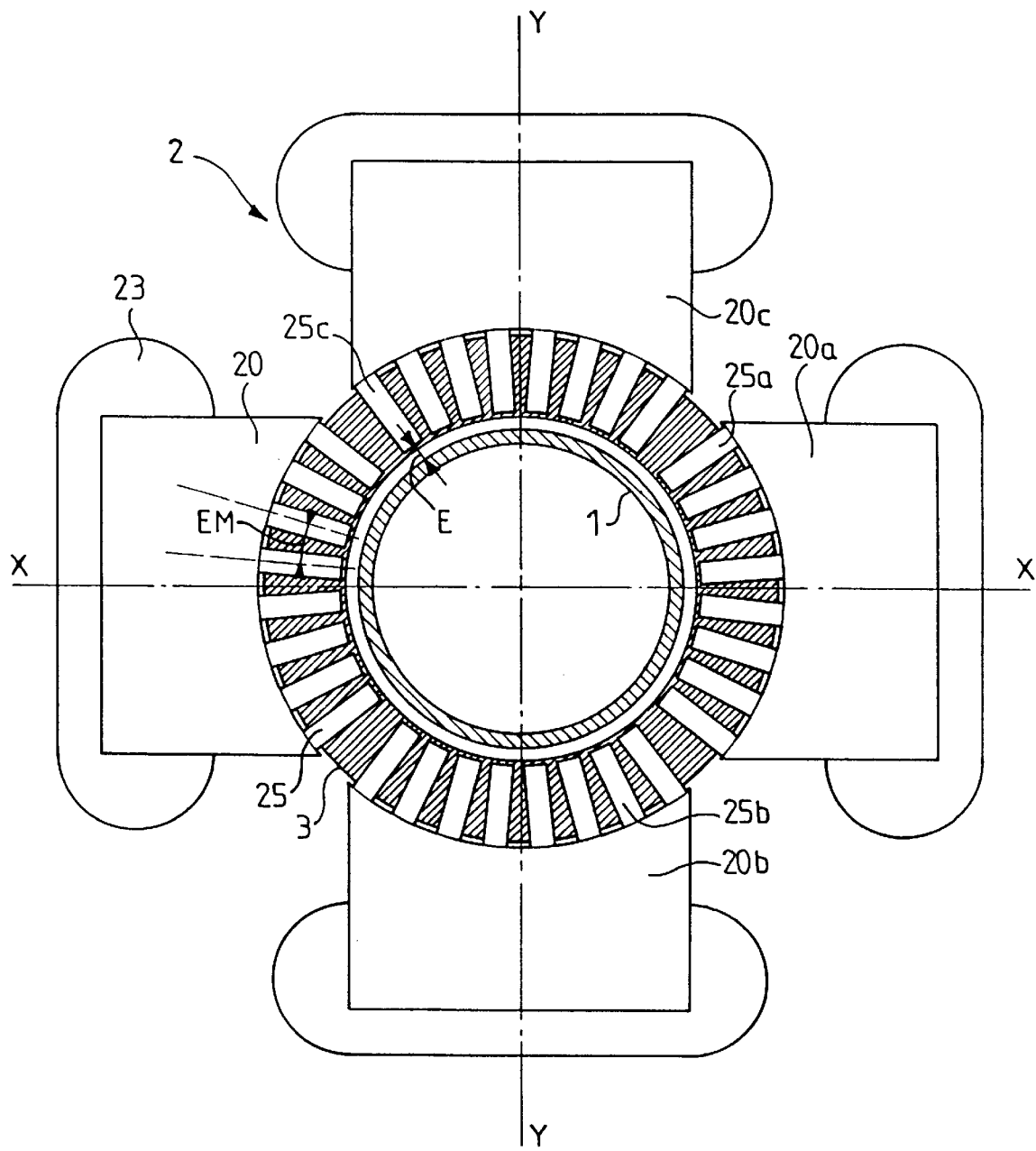
FIG. 2 is a radial sectional view taken along the line II—II in FIG. 1 of the magnetic bearing from FIG. 1, with the relative dimensions changed to make the diagram easier to understand.

Referring to FIGS. 1 and 2, the invention applies to a magnetic bearing embodying a rotor part 1, a stator part 2 and the wall 3 of a confinement chamber. The rotor part 1 and stator part 2 form an airgap E between them in which the chamber wall 3 is situated. The rotor and stator parts 1 and 2 are fastened to a stator A and a stator B, respectively.

The rotor A is a cylindrical shaft having a longitudinal axis Z—Z. At least in the part facing the stator part 2, the rotor part 1 is made from a ferromagnetic material and thus constitutes a polepiece advantageously provided with two flanges 10 and 11.

The flange has two radial centering axis X—X and Y—Y perpendicular to the rotation axis Z—Z of the rotor 1. For each centering axis the stator part 2 comprises a pair of magnetic assemblies disposed symmetrically about the rotation axis Z—Z.

The stator part 2 includes a first assembly or half-bearing including two parallel first ferromagnetic plates 20 and 21. The plates 20 and 21 are polepieces perpendicular to the axis Z—Z and face the respective flanges 10 and 11. An axially magnetized permanent magnet 22 is inserted between the plates 20 and 21, and a winding or coil 23 is situated between the plates 20 and 21 and wound around a core 24.

The permanent magnet 22 generates a magnetic flux, part of which passes into the polepieces 20 and 21, the airgap E and the rotor part 1. When a current flows in the coil 23 an induced flux is generated that is added to or subtracted from the magnetic flux due to the magnet 22. The remainder of the flux from the magnet passes through the core 24 and is maintained at an appropriate fraction of the total flux of the magnet 22 by a nonmagnetic shim 27 forming a static airgap.

The other three assemblies are identical. A first pair embodies the polepieces 20 and 21 previously described and identical polepieces 20a and 21a offset 180° about the axis Z—Z. The pairs 20, 21 and 20a, 21a are aligned on the centering axis X—X perpendicular to the axis Z—Z. A second pair of assemblies is aligned on the centering axis Y—Y perpendicular to the previous two axes and embodies polepieces of which only the top polepieces 20b and 20c can be seen in FIG. 2.

In other words, the assemblies are regularly distributed about the stator so that the induced fluxes generated in the windings of the assemblies assure active radial positioning of the rotor A relative to the stator B.

The longitudinal positioning of the rotor relative to the stator is passive and is provided by the flanges 10 and 11 facing the ends, or edges, of the polepieces. The flanges can naturally be eliminated if longitudinal centering is not required.

The chamber wall 3 is cylindrical and centered on the axis Z—Z. The chamber wall 3 is made from a nonmagnetic material such as stainless steel, aluminum, a plastic material or a composite material. The chamber wall 3 surrounds the rotor part 1, at least in the region facing the stator part 2, but has no contact with the rotor part 1. The chamber wall 3 is joined to the stator part 2 in a manner to be described in more detail hereinafter. The function of the chamber wall 3 is to isolate the rotor from the surrounding environment and so make it possible to impose an "extreme" environment around the rotor, such as a high temperature, high pressure, primary vacuum, ultrahard vacuum, corrosive, toxic or radioactive environment. The material and the thickness of the chamber wall 3 are suited to the intended application.

In all cases, the chamber wall 3 is in the airgap E between the stator and rotor parts.

Referring more particularly to FIG. 2, the polepiece 20 advantageously embodies identical radial fingers 25, of which there are eight in this example. The fingers 25 are preferably cylindrical, but can instead have a frustoconical shape or an oval cross-section. The fingers 25 are regularly distributed along the edge of the polepiece 20 facing the flange 10.

Two adjacent fingers have convergent longitudinal axes, the mean separation EM of which is preferably between 1.2 times the width of the fingers and 3 times the width of the fingers.

The polepieces 20a, 20b and 20c, respectively embody fingers 25a, 25b and 25c that are in practise identical to the fingers 25.

Similarly, the polepieces 21, 21a, 21b and 21c, not shown in FIG. 2, embody fingers identical to the fingers 25.

The airgap E therefore has an effective width equal to the radial distance between the ends of the fingers and the rotor, in this example the edges of the flanges 10 and 11. The magnetic fluxes are guided in the fingers. Tests have shown that the electromagnetic behavior of this magnetic bearing is substantially equivalent to that of a conventional bearing with no wall and with continuous stator polepieces having an airgap the same size as the airgap E.

Figure 2A:
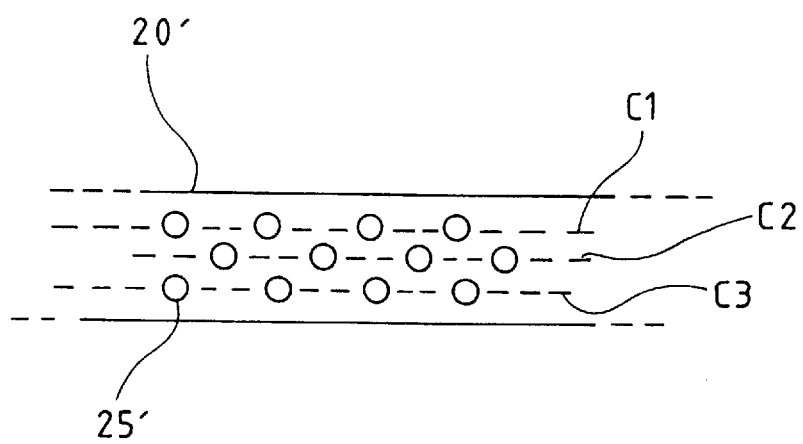
FIG. 2a is a view of a variant embodiment.

FIG. 2a shows a variant embodiment of the fingers in which the polepiece 20' includes a greater number of fingers 25' that are smaller than the fingers 25 of the polepiece 20.

The edge of the polepiece 20' includes several (in this example three) series of fingers 25'.

The series of fingers are disposed in three parallel circles C1, C2 and C3. A plurality of neighboring fingers 25' have a role equivalent to that of a finger 25 as previously described, but the mechanical strength of the chamber wall associated with these fingers 25', and including corresponding holes, can in some specific applications be greater than that of the wall that is described hereinafter.

Figure 3:
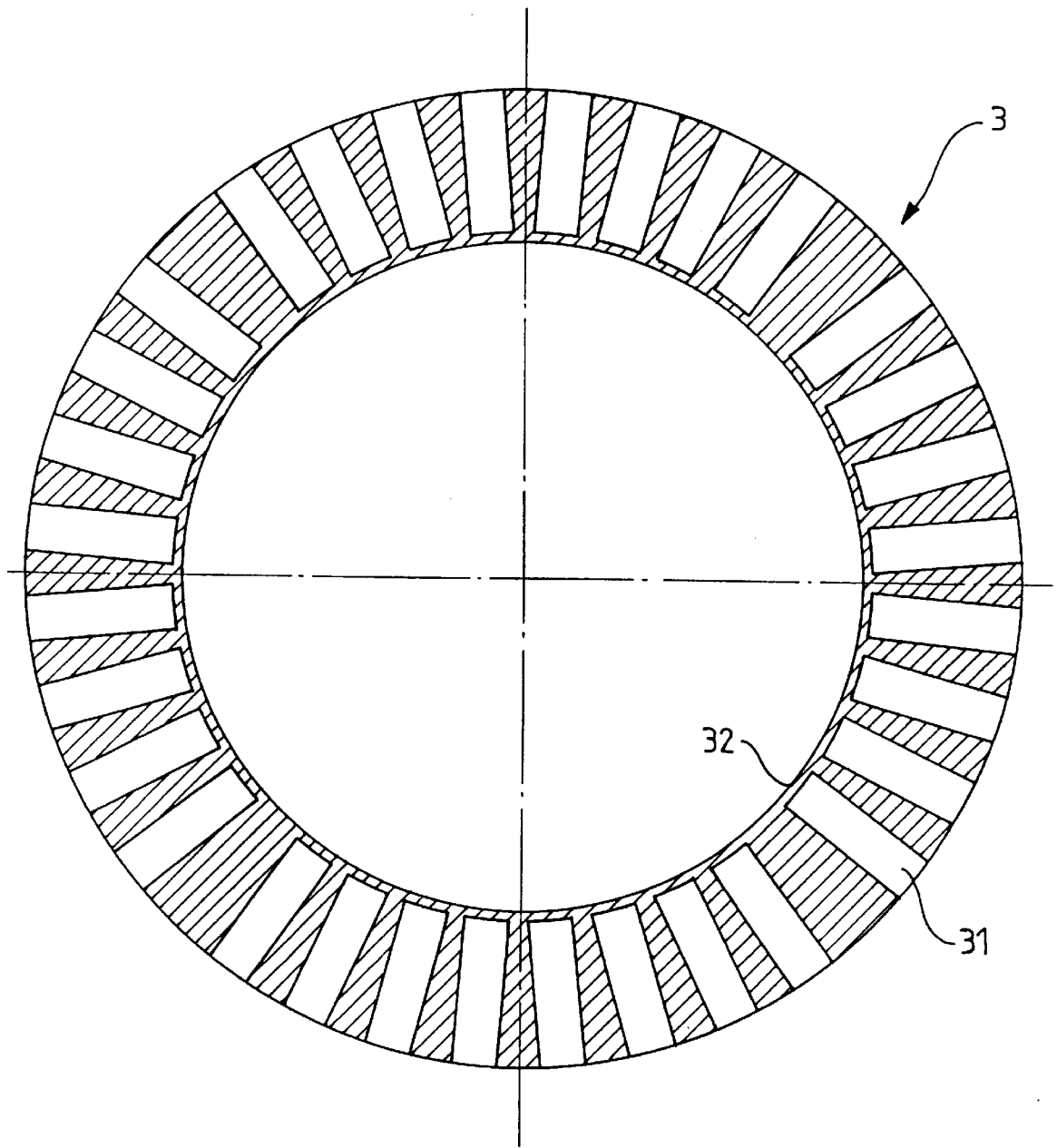
FIG. 3 is a radial sectional view taken along the line II—II in FIG. 1 of the confinement chamber of the magnetic bearing from FIG. 1.

Referring to FIG. 3, in one particular embodiment the chamber wall 3 has an outside diameter of 80 mm and an inside diameter of 55 mm. Radial holes 31 are provided in four equally distributed regions of the perimeter. The radial holes 31 are adapted to receive the fingers 25, 25a, 25b and 25c previously described. The relative positions and the dimensions of the holes 31 match those of the fingers. The fingers extend about 90% to about 98% of the thickness of the wall.

Accordingly, in FIG. 3, each of the holes 31 is cylindrical, has a diameter of 7 mm and a length of about 22 mm so that a residual wall 32 having a thickness of about 1 mm is provided between the bottom of the hole 31 and the inside surface of the chamber wall 3. The increase in the airgap due to the presence of the chamber is therefore limited to the thickness of the residual wall 32, which is small in comparison with the thickness of the chamber wall 3.

Consequently, the increase in the dimensions of the magnetic bearing due to the wall is limited.

To assemble the polepieces 20 and 21, the fingers 25 and the chamber wall 3, the fingers 25, which are initially separated from the polepieces, are first inserted into the radial holes 31 in the chamber wall 3, after which the edge of the polepieces 20 and 21 is applied against the edge of the fingers 25 outside the radial holes 31.

The polepieces 20 and 21 and the finger 25 are fastened together by pressing during assembly of the stator part or by gluing.

The chamber wall 3 is provided with a second series of radial holes, not shown in FIG. 3, axially offset from the first series and adapted to receive the fingers of the polepieces 21, 21a, 21b and 21c.

Experiments have shown that the mechanical strength of the chamber wall 3 is equivalent to that of a wall of the same dimensions with no holes.

Figure 4:
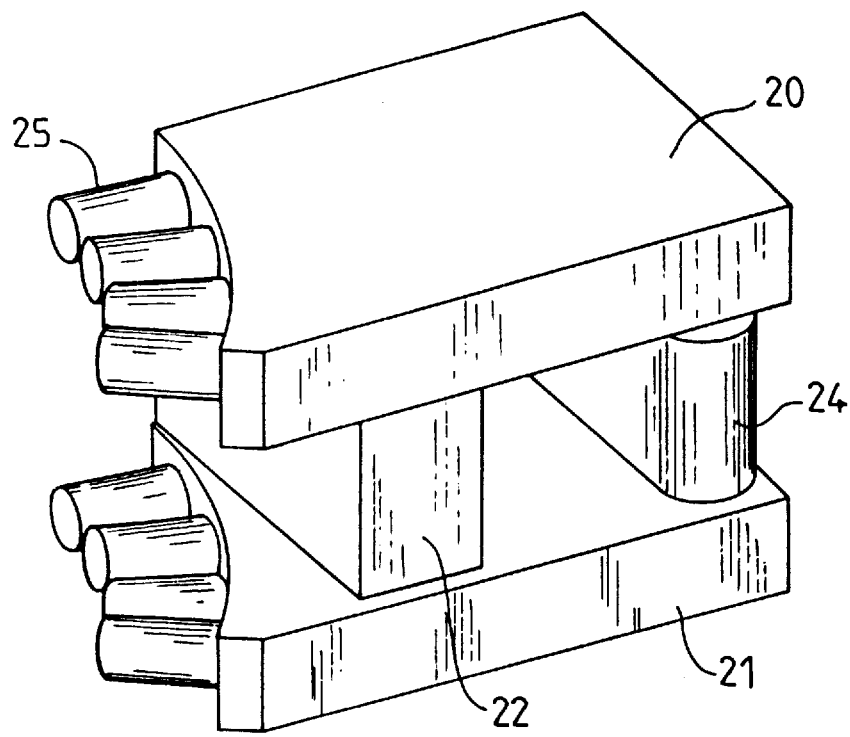
FIG. 4 is a fragmentary perspective view of the magnetic bearing from FIG. 1, with some components removed.

Referring to FIG. 4, there is seen a magnetic assembly stator portion embodying the polepieces 20 and 21, the magnet 22 and the core 24, the winding 23 having been omitted in this figure. The polepieces include the fingers 25 which are made from a magnetic material such as pure iron, for example. As already specified, the fingers 25 are cylindrical, although other shapes may be used in different embodiments: for example, a square or rectangular cross-section, elongate or flattened, or a frustoconical profile.

Figure 5:
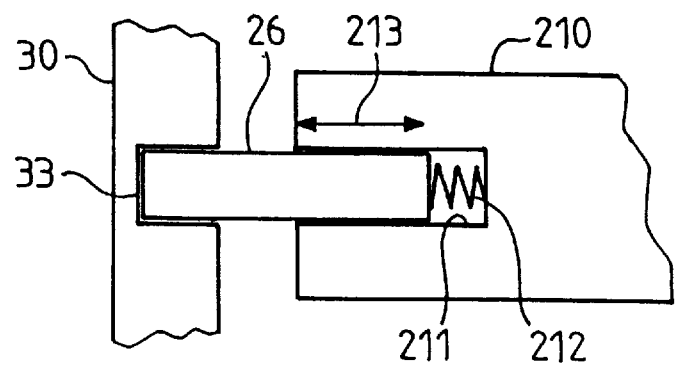
FIG. 5 is a fragmentary axial sectional view of the invention constituting a second embodiment magnetic bearing.

FIG. 5 shows a second embodiment in which fingers 26 are mobile relative to a polepiece 210. Only the components modified compared to the first embodiment are shown in FIG. 5. A hole 211 for each finger 26 is formed in the polepiece 210. The hole 211 has a diameter slightly greater than that of the finger 26 so that the finger can slide in the hole 211. The finger 26 is inserted into a hole 33 of a chamber wall 30. The finger 26 is fixed in or slides in the hole 33. A spring 212 in the back of the hole 211 preferably pushes the finger 26 against the chamber wall 30. The spring may be replaced by a block of elastic or resilient material, such as an elastomer material, or dispensed with. The sliding of the finger 26 relative to the polepiece 210 is in all cases of small amplitude as compared with the length of the finger. Similarly, the longitudinal contact portion 213 between the finger 26 and the inside wall of the hole 211 remains significantly greater than the cross-section of the finger so that the magnetic flux flows without impediment. This embodiment allows the magnetic bearing to adapt to expansion due to heating of the components or to important variations of pressure. If the confinement chamber is intended to be subjected to high stresses, the unwanted airgaps introduced by the clearances needed to withstand such stresses are limited.

Figure 6:
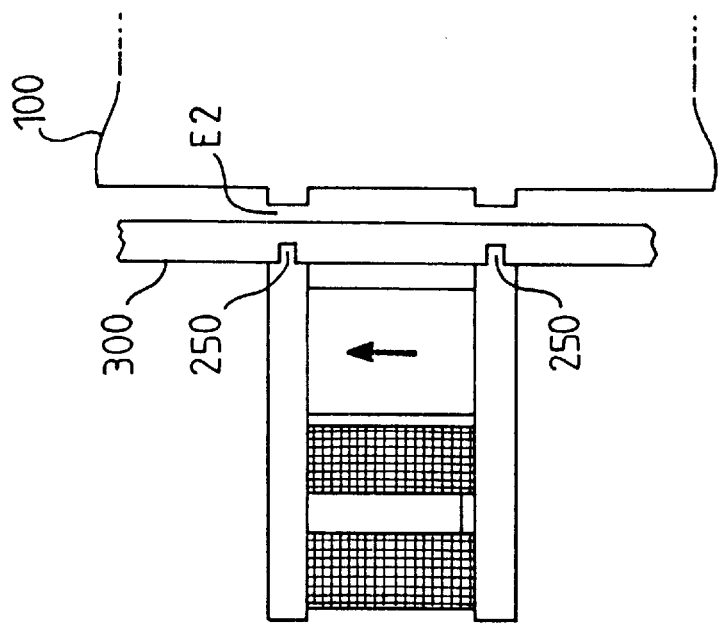
FIG. 6 is a cross-sectional view of a magnetic bearing constituting a third embodiment of the invention.
Figure 6:
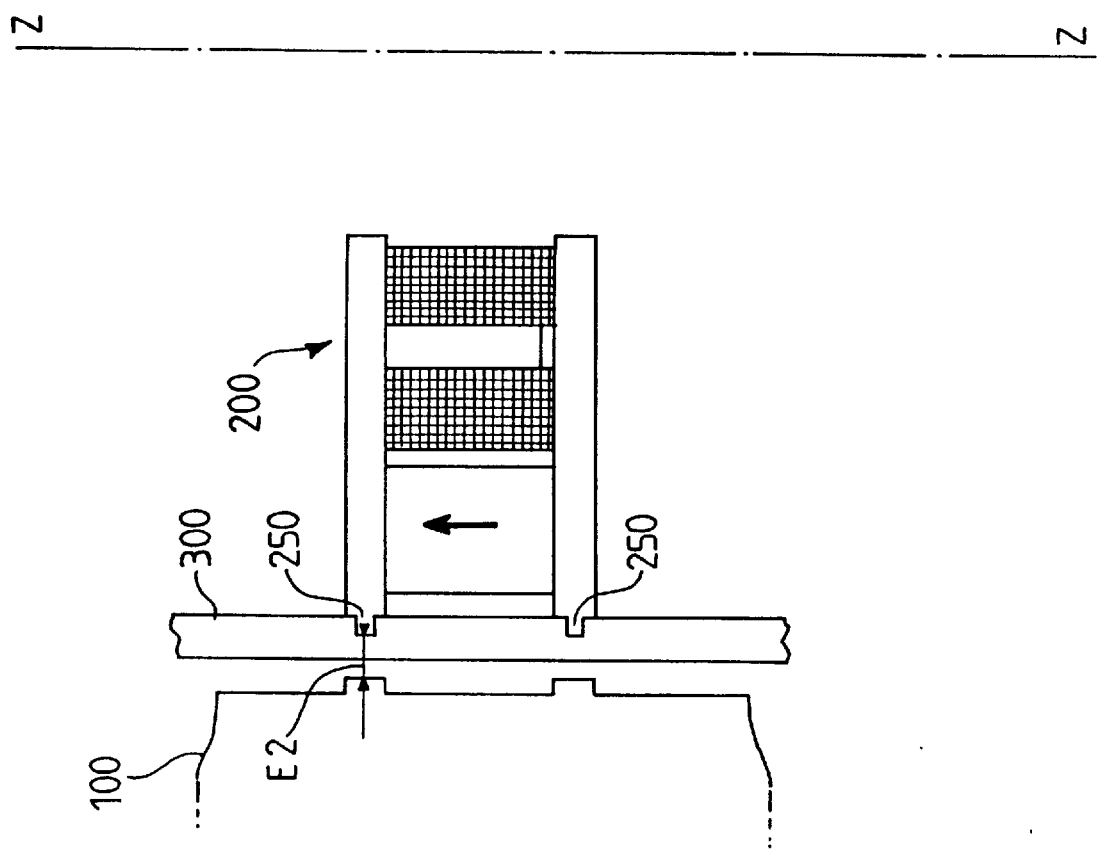

Referring to FIG. 6, a third embodiment of a magnetic bearing of the invention embodies a mobile part 100, a fixed central part 200 and a confinement chamber wall 300. The mobile and fixed parts are ferromagnetic and the confinement chamber is nonmagnetic. This fourth embodiment is different from the previous ones in that the mobile part is outside the polepieces.

The mobile part 100 is a hollow cylinder with axis Z—Z inside which is the fixed part 200. The fixed part 200 embodies pairs of assemblies each constituted of polepieces in the form of ferromagnetic plates, a magnet and a winding. The fixed and mobile parts are separated by a cylindrical airgap E2.

The chamber wall 300 is a cylinder disposed between the mobile part and the fixed part in the airgap E2. The edges of the polepieces embody radial fingers 250 that penetrate corresponding holes in the chamber wall 300. The fingers 250 are similar to those previously described. In particular, the fingers 250 are cylindrical.

Figure 7:
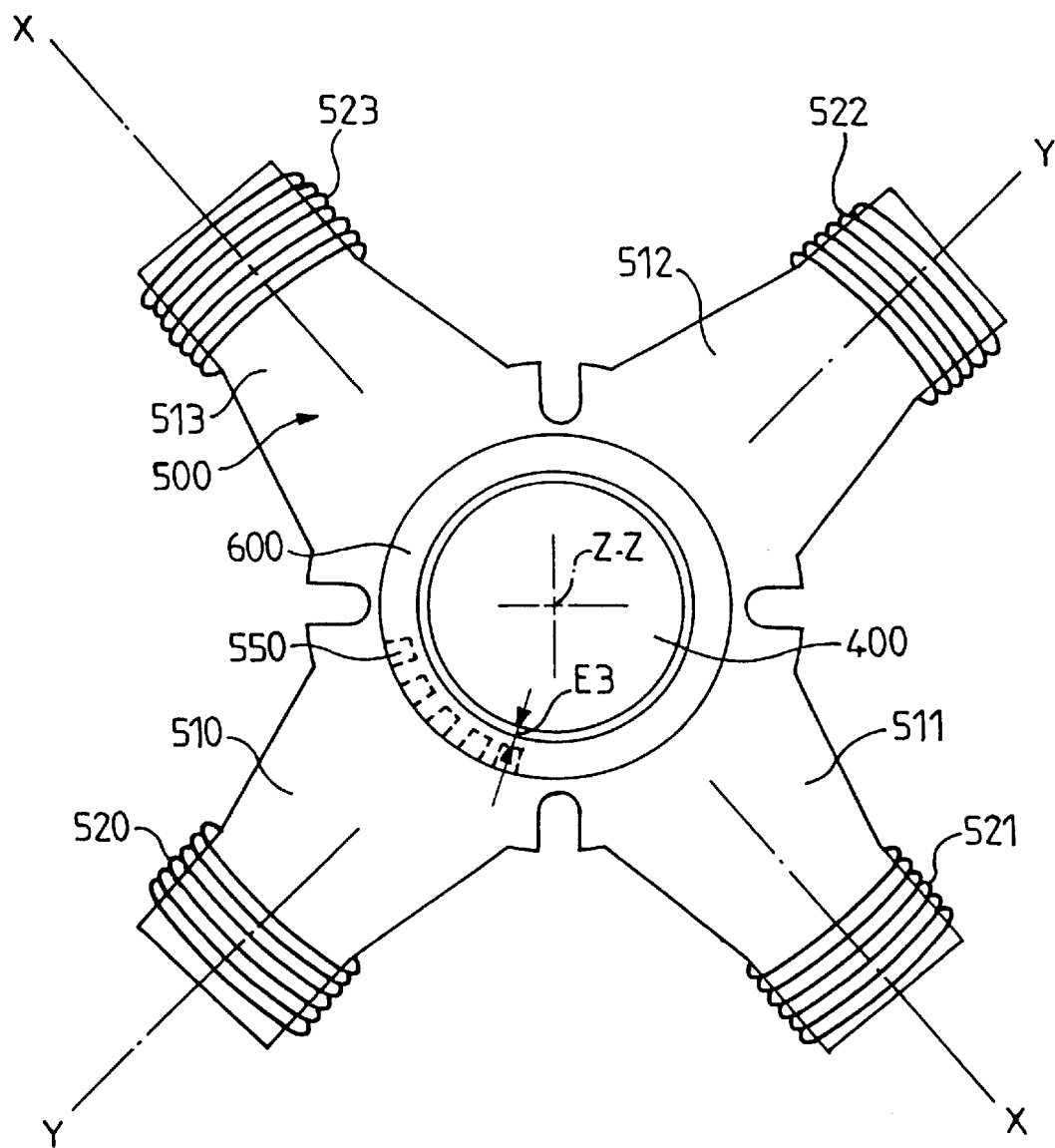
FIG. 7 is a top view of a magnetic bearing constituting a fourth embodiment of the invention.

Referring to FIG. 7, a fourth embodiment of the invention is a magnetic bearing with no magnet. This bearing embodies a cylindrical rotor part 400 with axis Z—Z, a stator part 500 and a chamber wall 600.

The bearing has two radial centering axes X—X and Y—Y perpendicular to the rotation axis Z—Z of the rotor part 400. For each centering axis the stator part 500 embodies a pair of polepieces disposed symmetrically about the rotation axis Z—Z. Only the top polepieces 510, 511, 512 and 513 can be seen in FIG. 8, the bottom polepieces being located exactly underneath them. The top and bottom polepieces of each pair are connected by a ferromagnetic axial polepiece, not shown, at a distance from the rotor part. A winding 520, 521, 522 and 523 connected to a power supply device supplies flux to each of the polepieces to locate the rotor part radially.

The rotor and stator parts form a cylindrical airgap E3 between them. The chamber wall 600 is cylindrical and interposed in the airgap E3. The top and bottom polepieces of the stator part embody radial fingers 550 penetrating holes in the chamber 600. The fingers 550 are identical to those described with reference to the first embodiment.

There is claimed:

1. A magnetic actuator comprising:

a fixed ferromagnetic part having a central axis;

a mobile ferromagnetic part spaced a predetermined distance from said fixed ferromagnetic part whereby said fixed and mobile ferromagnetic parts define an airgap between them, said airgap extending transverse to said central axis;

a nonmagnetic wall having a predefined thickness, said wall interposed said fixed and mobile ferromagnetic parts within said airgap; and a plurality of fingers attached to one of said fixed ferromagnetic part and said mobile ferromagnetic part, said fingers penetrating more than one-half of said thickness of said nonmagnetic wall and extending transverse to said central axis towards the other of said fixed and mobile ferromagnetic parts.

2. The magnetic actuator as claimed in claim 1 wherein each finger of said plurality of fingers is cylindrical.

3. The magnetic actuator as claimed in claim 1 wherein said plurality of fingers extend 90% to 98% of said thickness of said wall.

4. The magnetic actuator as claimed in claim 1 wherein said plurality of fingers are fixed relative to said fixed ferromagnetic part.

5. The magnetic actuator as claimed in claim 1 wherein said fixed ferromagnetic part further comprises a plurality of apertures and a compression spring mounted in each of said plurality of apertures, each finger of said plurality of fingers being slidably received in a respective aperture of said plurality of apertures.

6. A magnetic actuator as claimed in claim 5 further comprising means for biasing said plurality of fingers towards said nonmagnetic wall.

7. The magnetic actuator as claimed in claim 1 wherein said mobile ferromagnetic part is substantially cylindrical about said central axis, said fixed ferromagnetic part comprising at least one pair of fixed ferromagnetic parts, each one of said at least one pair of fixed ferromagnetic parts having radial fingers, each of said at least one pair of fixed ferromagnetic parts being adapted to create a magnetic flux passing at least partly through said radial fingers, said airgap and said mobile ferromagnetic part, and further wherein said wall is cylindrical at least in the region of said airgap defined by said mobile ferromagnetic part and said at least one pair of fixed ferromagnetic parts.

8. The magnetic actuator as claimed in claim 1 constituting a magnetic bearing that is magnetically active transverse to said central axis.

* * * * *

UNITED STATES PATENT AND TRADEMARK OFFICE
CERTIFICATE OF CORRECTION

PATENT NO. : 5,880,546
DATED : March 9, 1999
INVENTOR(S) : Marroux et al.

It is certified that error appears in the above-identified patent and that said Letters Patent is hereby corrected as shown below:

Column 3, line 19, kindly delete "stator" and insert ---- rotor ----.

Column 4, line 26, kindly delete "practise" and insert ---- practice ----.

Signed and Sealed this

Twenty-seventh Day of July, 1999

Attest:

Q. TODD DICKINSON

*Attesting Officer*  *Acting Commissioner of Patents and Trademarks*